(12) United States Patent
Binek et al.

(10) Patent No.: US 12,473,842 B2
(45) Date of Patent: Nov. 18, 2025

(54) ANNULAR OIL DISTRIBUTOR FOR BEARING CHAMBER

(71) Applicant: RTX Corporation, Farmington, CT (US)

(72) Inventors: Lawrence A. Binek, Glastonbury, CT (US); Christopher D. Ramsey, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 94 days.

(21) Appl. No.: 18/387,365

(22) Filed: Nov. 6, 2023

(65) Prior Publication Data

US 2024/0151271 A1 May 9, 2024

Related U.S. Application Data

(60) Provisional application No. 63/423,381, filed on Nov. 7, 2022.

(51) Int. Cl.
*F01D 25/18* (2006.01)
*B33Y 80/00* (2015.01)
(Continued)

(52) U.S. Cl.
CPC ........... *F01D 25/18* (2013.01); *F01D 25/164* (2013.01); *F02C 7/06* (2013.01); *B33Y 80/00* (2014.12)

(58) Field of Classification Search
CPC ...... F01D 25/16; F01D 25/162; F01D 25/164; F01D 25/18; F02C 7/06; F05D 2230/30;
(Continued)

(56) References Cited

U.S. PATENT DOCUMENTS

| 9,500,230 B2 | 11/2016 | Hiller et al. |
| 11,519,296 B1 | 12/2022 | Stiehler et al. |

(Continued)

FOREIGN PATENT DOCUMENTS

| DE | 102018202494 A1 | 8/2019 |
| EP | 2940324 B1 | 8/2017 |

(Continued)

OTHER PUBLICATIONS

Search Report issued in European Patent Application No. 23208214.9; Application Filing Date Nov. 7, 2023; Date of Mailing Mar. 19, 2024 (6 pages).

*Primary Examiner* — Elton K Wong
(74) *Attorney, Agent, or Firm* — CANTOR COLBURN LLP

(57) ABSTRACT

An oil distributor is provided for a bearing chamber. The oil distributor includes an outer annular manifold, which is integrally formed with an interior surface of the bearing chamber and which defines a first interior cavity receptive of pressurized oil which defines a first interior cavity receptive of pressurized oil, an inner annular manifold, which defines a second interior cavity and comprises an interior facing surface defining holes respectively communicative with the second interior cavity and one or more support struts by which the inner annular manifold is supported within the outer annular manifold. Each of the one or more support struts defines interior lines by which the pressurized oil flows from the first interior cavity to the second interior cavity and to the holes.

16 Claims, 6 Drawing Sheets

(51) Int. Cl.
*F01D 25/16* (2006.01)
*F02C 7/06* (2006.01)

(58) Field of Classification Search
CPC ........... F05D 2230/31; F05D 2230/311; F05D 2230/312; F05D 2230/313; F05D 2230/314; B33Y 80/00; B33Y 10/00
See application file for complete search history.

(56) References Cited

U.S. PATENT DOCUMENTS

| | | |
|---|---|---|
| 2015/0308502 A1 | 10/2015 | Hiller et al. |
| 2020/0080445 A1 | 3/2020 | Gysling et al. |
| 2021/0062679 A1 | 3/2021 | Marquie et al. |
| 2022/0235672 A1 | 7/2022 | Ovaere et al. |
| 2022/0397039 A1* | 12/2022 | Neuberger .............. F01D 25/16 |

FOREIGN PATENT DOCUMENTS

| | | |
|---|---|---|
| EP | 4102033 A1 | 12/2022 |
| WO | 2020260796 A1 | 12/2020 |

* cited by examiner

ANNULAR OIL DISTRIBUTOR FOR BEARING CHAMBER

CROSS-REFERENCE TO RELATED APPLICATIONS

This application claims the benefit of U.S. Provisional Application No. 63/423,381 filed Nov. 7, 2022, the disclosure of which is incorporated herein by reference in its entirety.

BACKGROUND

Exemplary embodiments of the present disclosure relate generally to gas turbine engines and, in one embodiment, to an annular oil distributor for a bearing chamber of a gas turbine engine.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or to produce electricity in a generator.

Certain parts, such as a bearing chamber, in a gas turbine engine need a supply of oil for cooling. In conventional systems, this oil is supplied via nozzles. A problem with the conventional nozzles is that they are expensive and require significant numbers of additional parts for fastening the nozzles in place.

Accordingly, a need exists for improved oil distribution in a bearing chamber of a gas turbine engine.

BRIEF DESCRIPTION

According to an aspect of the disclosure, an oil distributor for a bearing chamber is provided for a component. The oil distributor includes an outer annular manifold, which defines a first interior cavity receptive of pressurized oil, an inner annular manifold, which defines a second interior cavity and comprises an interior facing surface defining holes respectively communicative with the second interior cavity and one or more support struts by which the inner annular manifold is supported within the outer annular manifold. Each of the one or more support struts defines interior lines by which the pressurized oil flows from the first interior cavity to the second interior cavity and to the holes.

In accordance with additional or alternative embodiments, the component includes a bearing chamber.

In accordance with additional or alternative embodiments, the oil distributor is additively manufactured with the bearing chamber.

In accordance with additional or alternative embodiments, the outer annular manifold is integrally formed with an interior surface of the bearing chamber.

In accordance with additional or alternative embodiments, the outer annular manifold includes a squirrel cage with linear supports through which the pressurized oil is flowable.

In accordance with additional or alternative embodiments, each of the one or more support struts has a narrowing taper with decreasing radial distance from the inner annular manifold.

In accordance with additional or alternative embodiments, the interior facing surface is cylindrical and the holes are arrayed in a lattice along the interior facing surface.

According to an aspect of the disclosure, a bearing chamber is provided and includes one or more nozzles and an oil distributor. The oil distributor includes an outer annular manifold, which is integrally formed with an interior surface of the bearing chamber and which is integrally formed with an interior surface of the bearing chamber and which defines a first interior cavity receptive of pressurized oil, an inner annular manifold, which defines a second interior cavity and includes an interior facing surface defining holes respectively communicative with the second interior cavity and one or more support struts by which the inner annular manifold is supported within the outer annular manifold. Each of the one or more support struts defines interior lines by which the pressurized oil flows from the first interior cavity to the second interior cavity and to the holes.

In accordance with additional or alternative embodiments, each of the one or more nozzles is configured to output oil toward a surface of the bearing chamber.

In accordance with additional or alternative embodiments, the oil distributor and each of the one or more nozzles are configured to output oil toward a different surface of the bearing chamber.

In accordance with additional or alternative embodiments, the oil distributor is additively manufactured with the bearing chamber.

In accordance with additional or alternative embodiments, the outer annular manifold includes a squirrel cage with linear supports through which the pressurized oil is flowable.

In accordance with additional or alternative embodiments, each of the one or more support struts has a narrowing taper with decreasing radial distance from the inner annular manifold.

In accordance with additional or alternative embodiments, the interior facing surface is cylindrical and the holes are arrayed in a lattice along the interior facing surface.

According to an aspect of the disclosure, a method of manufacturing a bearing chamber is provided. The method includes additively manufacturing the bearing chamber and additively manufacturing an oil distributor integrally with the bearing chamber. The oil distributor includes an outer annular manifold, which is integrally formed with an interior surface of the bearing chamber and which defines a first interior cavity receptive of pressurized oil, an inner annular manifold, which defines a second interior cavity and comprises an interior facing surface defining holes respectively communicative with the second interior cavity and one or more support struts by which the inner annular manifold is supported within the outer annular manifold. Each of the one or more support struts defines interior lines by which the pressurized oil flows from the first interior cavity to the second interior cavity and to the holes.

In accordance with additional or alternative embodiments, the method further includes additively manufacturing one or more nozzles integrally with the bearing chamber.

In accordance with additional or alternative embodiments, each of the one or more nozzles is configured to output oil toward a surface of the bearing chamber.

In accordance with additional or alternative embodiments, the oil distributor and each of the one or more nozzles are configured to output oil toward different surfaces of the bearing chamber.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
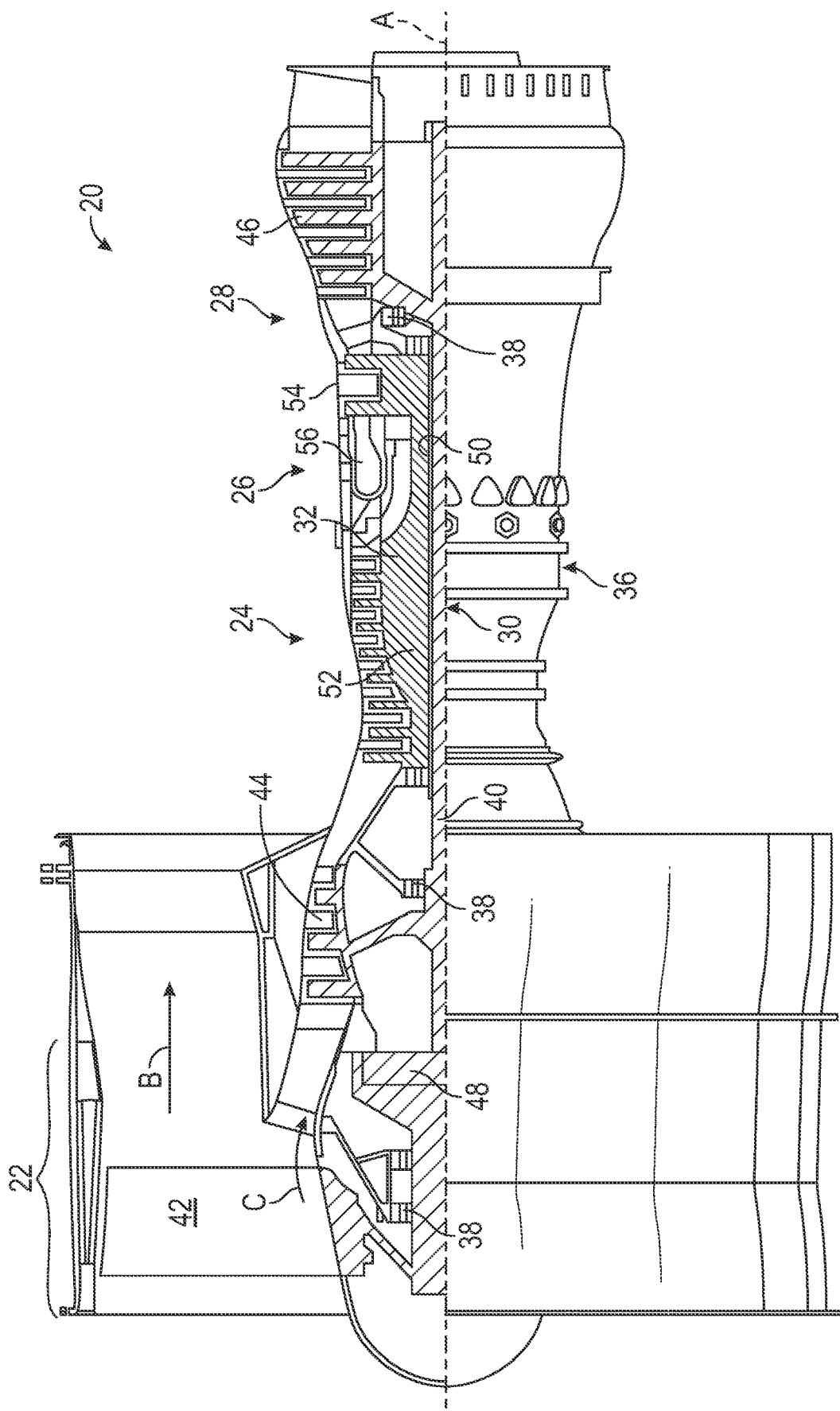
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Within the gas turbine engine 20, bearings are used to provide smooth relative rotation between the various shafts and non-rotating components and/or between two shafts which rotate at different speeds. An oil lubrication system can be provided that includes an oil pump, sometimes referred to as a main pump, and a network of conduits and nozzles to feed the bearings with oil. This oil is contained in bearing cavities, typically formed inside annular bearing chambers. A scavenge system having one or more scavenge lines extending from the bearing chambers and one or more scavenge pumps can be used to recover the oil, which can be in the form of an oil foam at that stage. Air/oil separation and filtering is typically provided for before returning the processed oil to the bearings.

In the bearing chambers, air and oil flows mix and generate a flow pattern about the engine central longitudinal axis A. The oil flow pattern generally operates as follows: Oil particles coalesce along internal bearing chamber partitions and form a liquid partition film which contains air bubbles. In the radial space between the rotating shaft and the liquid oil film, a mixture of air and dispersed oil particles swirl in a circumferential direction at a velocity greater than the liquid oil film flow along the partitions. As a result, the oil film flow is exposed to high shear stresses at the air/oil film interface. Film thickness and velocity distributions inside the bearing are driven by the magnitude of that interfacial shear and superimposed effects of gravitational forces.

To achieve bearing chamber functionality, air and oil flows are discharged to an oil scavenge system which communicates with the oil sump and which is partially formed within the bearing chamber.

As will be described below, an annular oil distributor of the gas turbine engine 20 of FIG. 1 is provided. The oil supply annulus can be integral to the rest of the bearing chamber body and is composed of network of channels (i.e., 50,000ths diameter). The channels may be fitted with converging/diverging breakout sections with the goal being to get better oil coverage in the bearing chamber. The oil supply annulus may have a built-in redundancy in a main artery. This can lead to a reduction in mass flow, but only a slight one. The oil supply annulus may have an outer manifold, an inner manifold (where the holes, which may have a conical opening, are located) that is disposed outside of a rotating component and conical lines feeding oil from the outer manifold to the inner manifold. Oil is pressurized before it gets to the outer manifold. The nozzles of a conventional oil distribution system may not be replaced entirely by the annular oil distributor, or moved to other locations. A squirrel cage of the bearing chamber could serve as at least a part of the annular oil distributor. The squirrel cage is typically used for bearing support. In this case, channels for oil flow can be run through linear supports and the squirrel cage would be contiguous with the main body of the bearing chamber or provided with an interface.

With continued reference to FIG. 1 and with additional reference to FIGS. 2-5, an annular oil distributor (hereinafter referred to as an "oil distributor") 201 is provided for a component, such as a bearing component 202 of the gas turbine engine 20 of FIG. 1. The oil distributor 201 can be additively manufactured with the bearing chamber 202 and can have a complex geometry as such.

In any case, the oil distributor 201 includes an outer annular manifold 210, which is integrally formed with an interior surface 203 of the bearing chamber 202 and which is formed to define one or more first interior cavities 211 that are receptive of pressurized oil, and an inner annular manifold 220, which is formed to define a second interior cavity 221 and which includes an interior facing surface 222. The interior facing surface 222 can be substantially cylindrical and is formed to define a lattice array of holes 223 that are respectively communicative with the second interior cavity 221. The oil distributor 201 further includes one or more support struts 230 (see FIG. 5) by which the inner annular manifold 220 is supported within the outer annular manifold 210. Each of the one or more support struts 230 is formed to define interior lines 231 by which the pressurized oil flows from the one or more first interior cavities 211 to the second interior cavity 221 and to the holes 223 via the second interior cavity 221. In addition, each of the one or more support struts 230 has a narrowing taper 232 with decreasing radial distance D (see FIG. 5) from the inner annular manifold 220.

Figure 4:
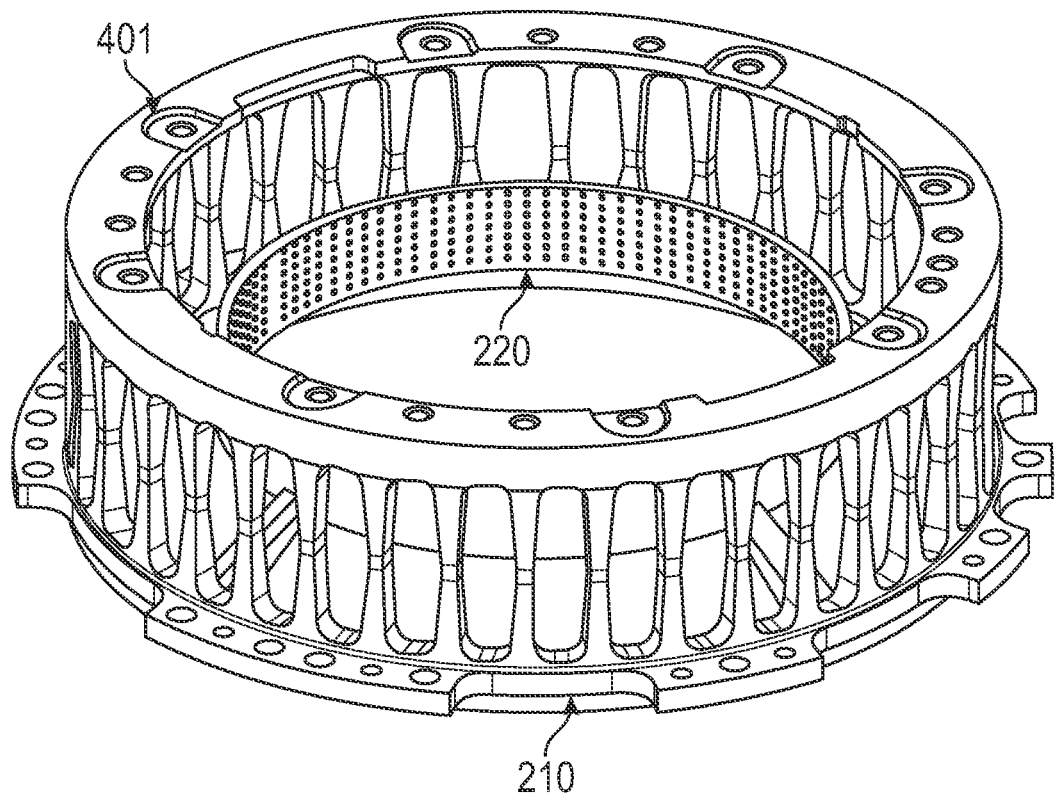
FIG. 4 is a perspective view of the annular oil distributor of FIGS. 3 and 4 provided as a squirrel cage in accordance with embodiments.
Figure 5:
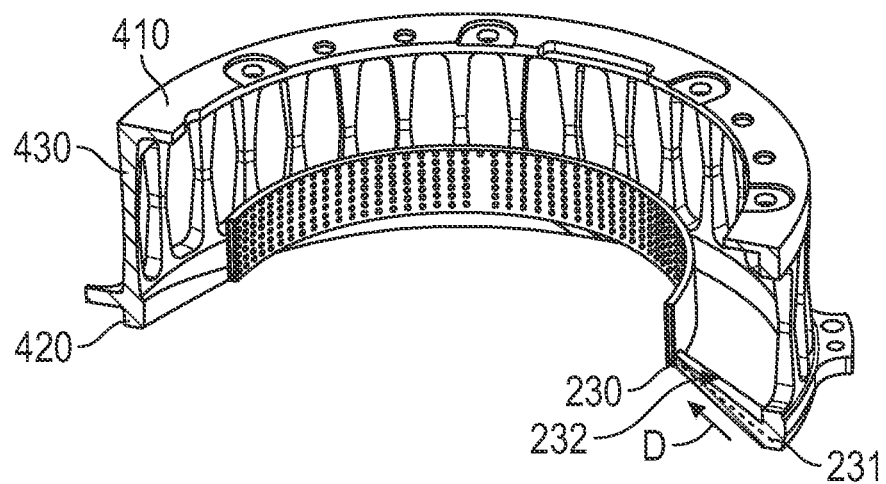
FIG. 5 is a cutaway perspective view of the annular oil distributor of FIG. 4 in accordance with embodiments.

In accordance with embodiments and as shown in FIGS. 4 and 5, the outer annular manifold 210 can include or be provided as a squirrel cage 401 of the bearing chamber 202. In these or other cases, the outer annular manifold 210 can be provided as an upper manifold portion 410, a lower manifold portion 420 to which the one or more support struts 230 can be connected and an annular array of linear supports 430. Although FIG. 5 illustrates these features as solid, it is to be understood that the upper manifold portion 410, the lower manifold portion 420 and each of the linear supports 430 can be formed to including a hollow interior defining the one or more first interior cavities 211.

As such, pressurized oil can be received in the one or more first interior cavities 211 of the upper manifold portion 410, the lower manifold portion 420 and the annular array of linear supports 430 and then can be transferred to the second interior cavity 221 of the inner annular manifold 220 via the interior lines 231 of the one or more support struts 230. The pressurized oil can then flow out of the second interior cavity 221 via the holes 223 to lubricate and cool the bearing chamber 202.

Figure 2:
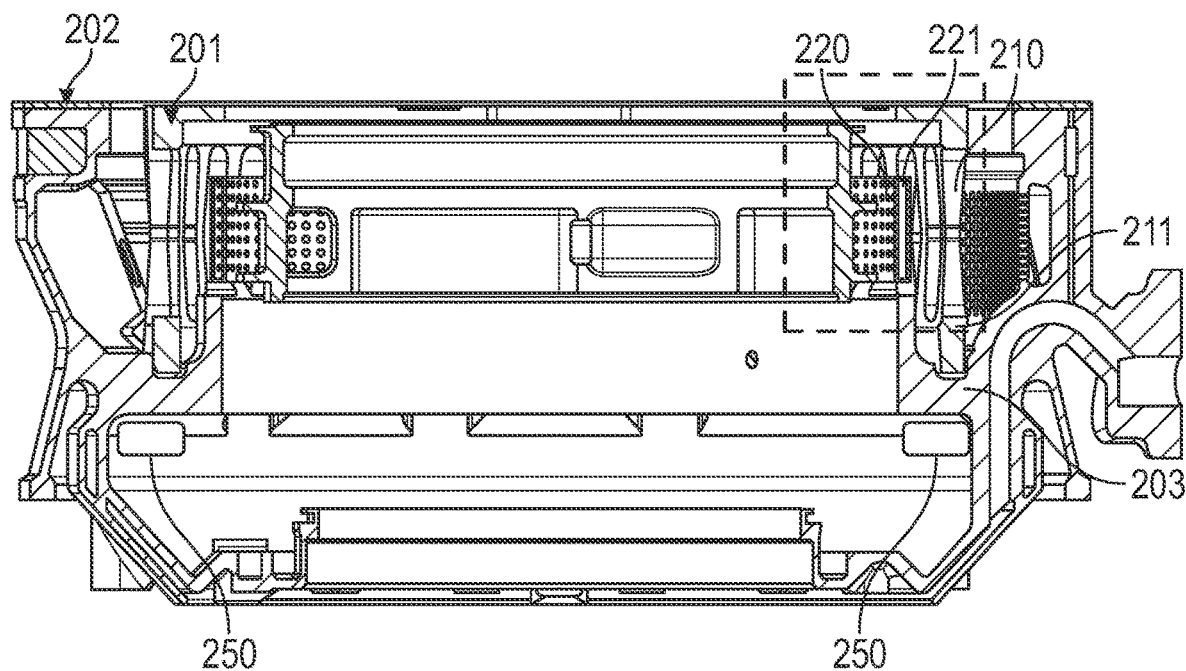
FIG. 2 is a side view of a bearing chamber with an annular oil distributor in accordance with embodiments.
Figure 3:
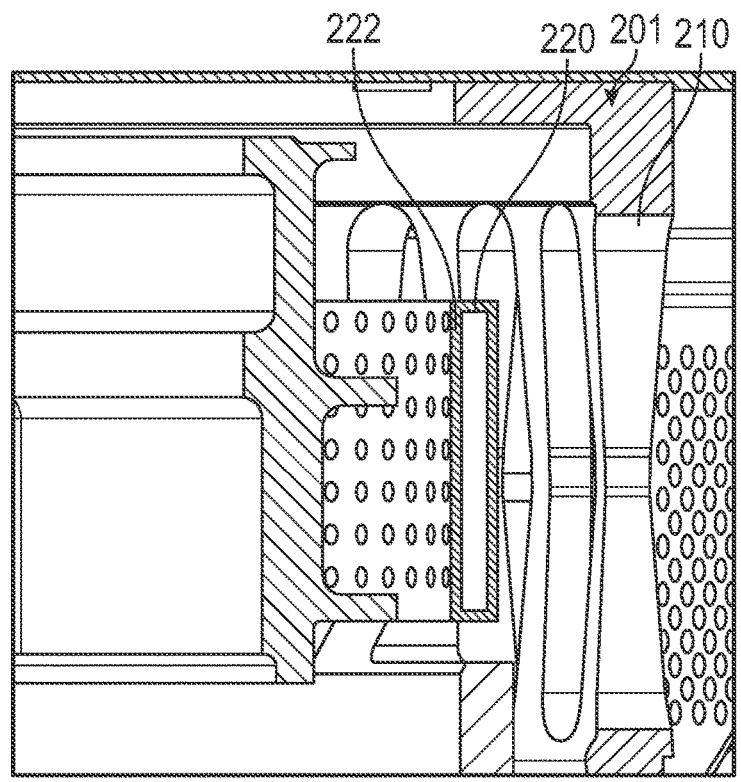
FIG. 3 is an enlarged view of the portion of FIG. 2 encompassed by the dashed line in FIG. 2.

With continued reference to FIG. 2, the bearing chamber 202 can include the oil distributor 201 as described above as well as one or more nozzles 250 in a hybrid configuration. In these or other cases, the oil distributor 201 serves to lubricate and cool one section of the bearing chamber 202 (i.e., the upper section as shown in FIG. 2) while the one or more nozzle 250 serve to lubricate and cool another section or a different surface of the bearing chamber 202 (i.e., portions of the lower section as shown in FIG. 2). The presence or each feature type in the hybrid configuration allows for weight reduction in some cases as well as substantial oil distribution by the oil distributor 201 and targeted oil distribution by the one or more nozzles 250.

Figure 6:
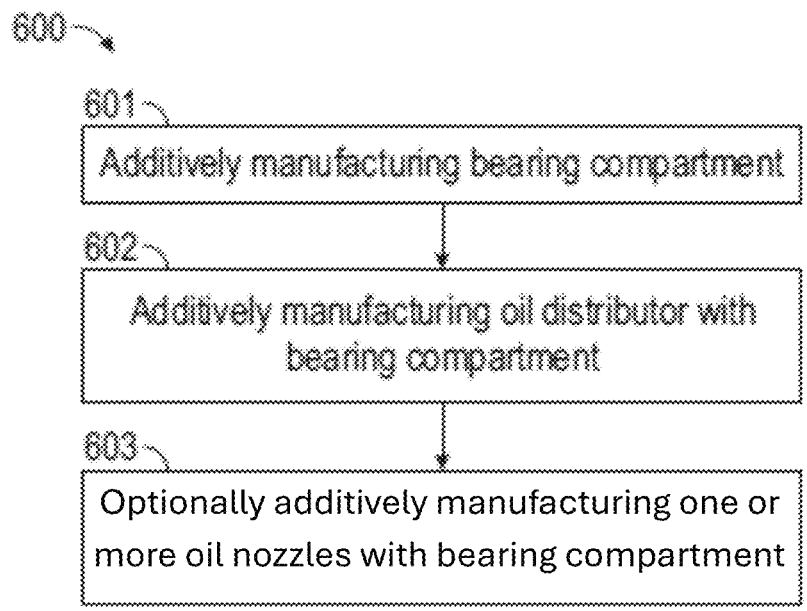
FIG. 6 is a flow diagram illustrating a method of manufacturing a bearing chamber in accordance with embodiments.

With reference to FIG. 6, a method 600 of manufacturing a bearing chamber, such as the bearing chamber 202 described above, is provided. The method 600 includes additively manufacturing the bearing chamber (block 601) and additively manufacturing an oil distributor integrally with the bearing chamber (block 602) where the oil distributor is provided as the oil distributor 201 described above. The method 600 can further include optionally additively manufacturing one or more oil nozzles with the bearing chamber (block 603).

Figure 7:
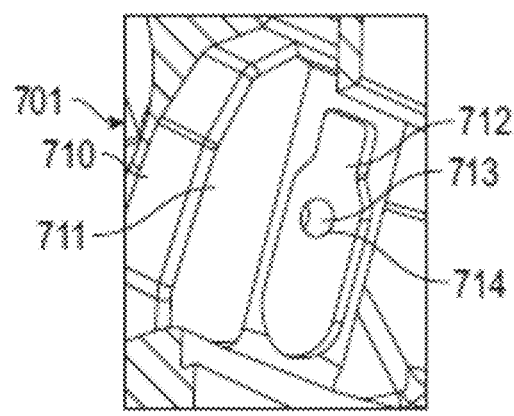
FIG. 7 is a perspective view of a bearing chamber and an interior surface of the bearing chamber with a terminal block in accordance with embodiments.
Figure 8:
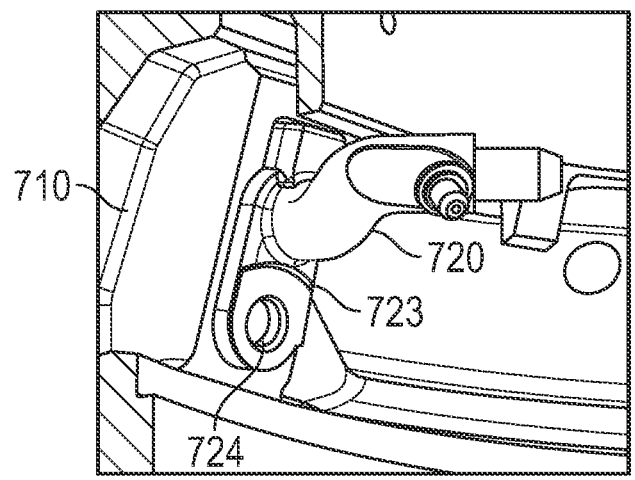
FIG. 8 is a perspective view of the bearing chamber and the interior surface of the bearing chamber with the terminal block of FIG. 7 and an oil nozzle in accordance with embodiments.
Figure 9:
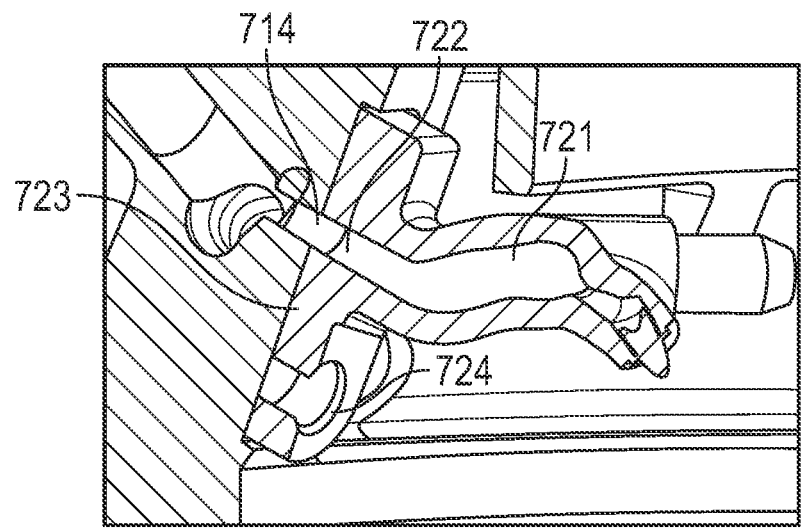
FIG. 9 is a perspective view of the bearing chamber and the interior surface of the bearing chamber with the terminal block of FIG. 7 and an interior of the oil nozzle of FIG. 8 in accordance with embodiments.

With reference to FIGS. 7-9, a bearing chamber 701 is provided and includes an interior surface 710, which can be additively manufactured, and an oil nozzle 720 and/or the oil distributor 201 as described above, both of which can also be additively manufactured. The interior surface 710 includes a terminal block 711 that is formed to define a keyway 712 and a conduit 713. The conduit 713 extends through a body of the bearing chamber 701 and terminates at a terminus 714 at the keyway 712. The oil nozzle 720 is formed to define an internal channel 721 with an opening 722 (i.e., the internal channel 211 of FIG. 3A) and includes a base 723, with the oil distributor 201 having similar features. Both the keyway 712 and the base 723 can be elongate. In any case, the base 723 is tightly fittable in the keyway 712. The base 723 can also include a fastening point 724, at which the base 723 is fastened to the terminal block 711 at the keyway 712.

When the base 723 is tightly fit in the keyway 712 as shown in FIGS. 8 and 9, the opening 722 of the internal channel 721 sits flush against the terminus 714 of the conduit 713 whereby the internal channel 721 is fluidly communicative with the conduit 713. As such, oil or other fluids directed into and through the conduit 713 enter and flow through the internal channel 721. In addition, when the base 722 is tightly fit in the keyway 712, an orientation of the keyway 712 and a configuration of the oil nozzle 720/oil distributor 201 are cooperatively established to aim the oil nozzle 720/oil distributor 201 at one or more predefined targets within the bearing chamber 701. In this way, the orientation of the keyway 712 and the configuration of the oil nozzle 720/oil distributor 201 work cooperatively to aim a flow of oil or other fluids passing through the internal channel 721 toward the one or more predefined targets.

Figure 10:
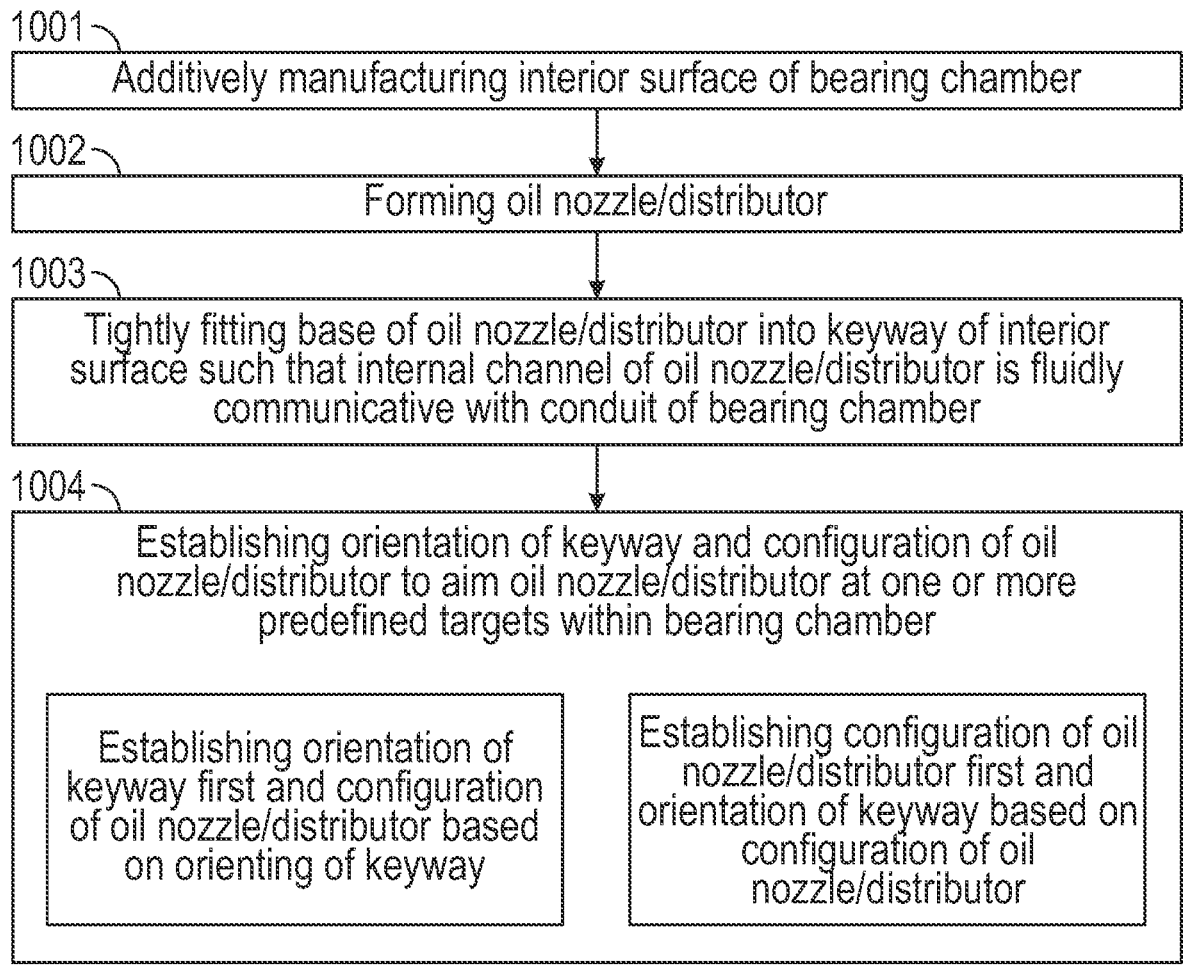
FIG. 10 is a flow diagram illustrating a method of additively manufacturing a bearing chamber in accordance with embodiments.

With reference to FIG. 10, a method of additively manufacturing a bearing chamber, such as the bearing chamber 701 of FIGS. 7-9, is provided. The method includes additively manufacturing an interior surface of the bearing chamber to include a terminal block defining a keyway and a conduit terminating at the keyway (block 1001) and forming an oil nozzle or distributor defining an internal channel and including a base (block 1002). The method further includes tightly fitting the base in the keyway such that the internal channel is fluidly communicative with the conduit (block 1003) and establishing an orientation of the keyway and a configuration of the oil nozzle or distributor to aim the oil nozzle or distributor at one or more predefined targets within the bearing chamber (block 1004).

In accordance with embodiments, in block 1004, the establishing of the orientation of the keyway can be set first and the configuration of the oil nozzle/distributor can be based on the orientating of the keyway or the establishing of the configuration of the oil nozzle/distributor can be set first and the orientation of the keyway can be based on the configuration of the oil nozzle/distributor.

Benefits of the features described herein are the provision of an oil distributor that can provide lubrication and cooling for a bearing chamber. The oil distributor can be formed integrally with the bearing chamber through the use of additive manufacturing that allows for complex geometries and fluid connections. In some cases, the oil distributor can be paired with one or more nozzles for additional oil distribution in a hybrid configuration that can allow for substantial oil distribution by the oil distributor and targeted oil distribution by the one or more nozzles.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An oil distributor for a bearing chamber, the oil distributor comprising:
    an outer annular manifold, which is integrally formed with an interior surface of the bearing chamber and which defines a first interior cavity receptive of pressurized oil;
    an inner annular manifold, which defines a second interior cavity and comprises an interior facing surface defining holes respectively communicative with the second interior cavity; and
    one or more support struts by which the inner annular manifold is supported within the outer annular manifold,
    each of the one or more support struts defining interior lines by which the pressurized oil flows from the first interior cavity to the second interior cavity and to the holes.

2. The oil distributor according to claim 1, wherein the oil distributor is additively manufactured with the bearing chamber.

3. The oil distributor according to claim 1, wherein the outer annular manifold comprises a squirrel cage with linear supports through which the pressurized oil is flowable.

4. The oil distributor according to claim 1, wherein each of the one or more support struts has a narrowing taper with decreasing radial distance from the inner annular manifold.

5. The oil distributor according to claim 1, wherein the interior facing surface is cylindrical and the holes are arrayed in a lattice along the interior facing surface.

6. A bearing chamber, comprising:
    one or more nozzles; and
    an oil distributor, comprising:
        an outer annular manifold, which is integrally formed with an interior surface of the bearing chamber and which defines a first interior cavity receptive of pressurized oil;
        an inner annular manifold, which defines a second interior cavity and comprises an interior facing surface defining holes respectively communicative with the second interior cavity; and
        one or more support struts by which the inner annular manifold is supported within the outer annular manifold,
        each of the one or more support struts defining interior lines by which the pressurized oil flows from the first interior cavity to the second interior cavity and to the holes.

7. The bearing chamber according to claim 6, wherein each of the one or more nozzles is configured to output oil toward a surface of the bearing chamber.

8. The bearing chamber according to claim 6, wherein the oil distributor and each of the one or more nozzles are configured to output oil toward a different surface of the bearing chamber.

9. The bearing chamber according to claim 6, wherein the oil distributor is additively manufactured with the bearing chamber.

10. The bearing chamber according to claim 6, wherein the outer annular manifold comprises a squirrel cage with linear supports through which the pressurized oil is flowable.

11. The bearing chamber according to claim 6, wherein each of the one or more support struts has a narrowing taper with decreasing radial distance from the inner annular manifold.

12. The bearing chamber according to claim 6, wherein the interior facing surface is cylindrical and the holes are arrayed in a lattice along the interior facing surface.

13. A method of manufacturing a bearing chamber to include an oil distributor, the method comprising:
    additively manufacturing the bearing chamber; and
    additively manufacturing the oil distributor integrally with the bearing chamber, wherein the additively manufacturing of the oil distributor comprises:

integrally forming, with an interior surface of the bearing chamber, an outer annular manifold, which defines a first interior cavity receptive of pressurized oil;

providing an inner annular manifold, which defines a second interior cavity and comprises an interior facing surface defining holes respectively communicative with the second interior cavity;

providing one or more support struts, each defining interior lines; and supporting, by the one or more support struts, the inner annular manifold within the outer annular manifold, such that the pressurized oil flows from the first interior cavity to the second interior cavity and to the holes by way of the interior lines defined by each of the one or more support struts.

14. The method according to claim 13, further comprising additively manufacturing one or more nozzles integrally with the bearing chamber.

15. The method according to claim 14, wherein each of the one or more nozzles is configured to output oil toward a surface of the bearing chamber.

16. The method according to claim 14, wherein the oil distributor and each of the one or more nozzles are configured to output oil toward different surfaces of the bearing chamber.

* * * * *